(12) United States Patent
He et al.

(10) Patent No.: US 11,932,192 B2
(45) Date of Patent: Mar. 19, 2024

(54) FASTENING STRAP CLAMP ASSEMBLY

(71) Applicant: ILLINOIS TOOL WORKS INC., Glenview, IL (US)

(72) Inventors: Jiahui He, Shanghai (CN); Mengli Sun, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 52 days.

(21) Appl. No.: 17/962,890

(22) Filed: Oct. 10, 2022

(65) Prior Publication Data

US 2023/0118668 A1 Apr. 20, 2023

(30) Foreign Application Priority Data

Oct. 19, 2021 (CN) .......................... 202111218442.X

(51) Int. Cl.
*B60R 21/21* (2011.01)
*B60R 21/216* (2011.01)

(52) U.S. Cl.
CPC .... *B60R 21/216* (2013.01); *B60R 2021/2163* (2013.01)

(58) Field of Classification Search
CPC .................. B60R 21/216; B60R 2021/2163
See application file for complete search history.

(56) References Cited

U.S. PATENT DOCUMENTS

| 4,004,388 | A  | * | 1/1977  | Stefanik | B64C 1/1492 |
|           |    |   |         |          | 52/204.593  |
| 9,669,775 | B2 | * | 6/2017  | Yamamoto | F16B 2/20   |
| 9,821,747 | B2 | * | 11/2017 | Benedetti | F16B 21/075 |
| 10,967,809| B2 | * | 4/2021  | Naoi     | B60R 21/2155 |
| 2008/0235919 | A1 | * | 10/2008 | Giddings | F16B 21/065 |
|           |    |   |         |          | 24/289      |
| 2016/0069366 | A1 | * | 3/2016  | Benedetti | F16B 5/065 |
|           |    |   |         |          | 24/297      |
| 2016/0101756 | A1 | * | 4/2016  | Benedetti | F16B 21/075 |
|           |    |   |         |          | 24/464      |

(Continued)

*Primary Examiner* — David M Upchurch
(74) *Attorney, Agent, or Firm* — McAndrews, Held & Malloy, Ltd.

(57) ABSTRACT

The present disclosure provides a fastening strap clamp assembly configured to fasten a first component and a second component of a vehicle together before and during deployment of a safety airbag of the vehicle. The fastening strap clamp assembly comprises a fastening strap housing and a fixing pin. The fastening strap housing comprises a fixing seat, a holder, and a fastening strap that connects the tightening seat to the holder. The fixing seat is configured to be fixed to the first component. The fixing pin locks the holder in a hole of the second component at a locked position. The fixing pin comprises a torsion bar extending along an extension axis, the torsion bar being elastically deformable by twisting around the extension axis, and the torsion bar engaging with the holder at a distal end of the torsion bar. The fixing pin further comprises an actuator that comprises a cam surface and a release surface connected to the cam surface. The cam surface fits with an edge of the hole of the second component to drive the torsion bar to twist so as to lock the holder in the hole of the second component by means of the fixing pin.

10 Claims, 8 Drawing Sheets

(56) References Cited

U.S. PATENT DOCUMENTS

| | | | |
|---|---|---|---|
| 2016/0121836 A1* | 5/2016 | Yamamoto | B60R 21/232 24/581.1 |
| 2016/0229368 A1* | 8/2016 | Dickinson | B60R 21/216 |
| 2016/0375842 A1* | 12/2016 | Yamamoto | B60R 13/02 24/289 |
| 2017/0313263 A1* | 11/2017 | Zander | F16B 21/06 |
| 2018/0099623 A1* | 4/2018 | Lee | B60R 21/216 |
| 2020/0114838 A1* | 4/2020 | Naoi | F16B 21/086 |
| 2020/0198552 A1* | 6/2020 | Naoi | B60R 21/2155 |
| 2023/0038221 A1* | 2/2023 | Park | B60R 13/0206 |

\* cited by examiner

FASTENING STRAP CLAMP ASSEMBLY

TECHNICAL FIELD

Embodiments of the present disclosure generally relate to a mount for an airbag that is configured to be used together with a vehicle, and more specifically relate to a fastening strap clamp assembly for an airbag that is configured to connect vehicle components together during deployment of the airbag.

BACKGROUND

Before being used in a vehicle, a vehicle safety airbag is wound and then covered by a trim panel (e.g., an A-pillar trim panel) of a vehicle. However, the trim panel of the vehicle is mounted on another component (e.g., a metal plate) of the vehicle by means of a fastener. When the safety airbag is deployed, the trim panel of the vehicle will be unfolded such that the deployed airbag can work.

SUMMARY OF THE DISCLOSURE

The present disclosure provides a fastening strap clamp assembly configured to fasten a first component and a second component of a vehicle together before and during deployment of a safety airbag of the vehicle. The fastening strap clamp assembly comprises a fastening strap housing and a fixing pin. The fastening strap housing comprises a fixing seat, a holder, and a fastening strap that connects the tightening seat to the holder. The fixing seat is configured to be fixed to the first component, and the holder is configured to be at least partially inserted into a hole of the second component. The fixing pin has a locked position, and the fixing pin is configured to lock the holder in the hole of the second component at the locked position. The fixing pin comprises a torsion bar extending along an extension axis, the torsion bar being elastically deformable by twisting around the extension axis, and the torsion bar engaging with the holder at a distal end of the torsion bar. The fixing pin further comprises an actuator, which is connected to a proximal end of the torsion bar and comprises at least one cam surface and at least one release surface connected to the at least one cam face, wherein the at least one cam surface spirally extends around the extension axis and is configured to fit with an edge of the hole of the second component to drive the torsion bar to twist to enable the fixing pin to be inserted into the hole of the second component; wherein the at least one release surface is configured to fit with the edge of the hole of the second component, so that at the end of the process of inserting the fixing pin into the hole of the second component, the torsion bar restores to a substantially undeformed state to lock the holder in the hole of the second component; and wherein the fixing pin is configured to be capable of being released from the locked position by torsion of the torsion bar to enable the holder to be removed from the second component.

According to the fastening strap clamp assembly mentioned above, the fixing pin further comprises a head portion, and the torsion bar and the actuator are connected to the head portion from the same side. The head portion is configured to enable the fixing pin to be released from the locked position by manipulating the head portion.

According to the fastening strap clamp assembly mentioned above, the holder comprises a support portion and a holding portion, the support portion being connected to the fastening strap, and the holding portion extending around at least a part of the fixing pin and being capable of being inserted into the hole of the second component, wherein the holding portion is connected to the support portion at a proximal end of the holding portion, and the holding portion engages with the distal end of the torsion bar at a distal end of the holding portion and holds the distal end of the torsion bar, so as to enable the proximal end of the torsion bar to be twisted relative to the distal end of the torsion bar.

According to the fastening strap clamp assembly mentioned above, the holding portion comprises a pair of legs extending parallel to each other and a foot portion connected between distal ends of the pair of legs, the torsion bar and the actuator of the fixing pin are located between the pair of legs; and the distal end of the torsion bar engages with the foot portion in a shape fitting manner.

According to the fastening strap clamp assembly mentioned above, the foot portion is provided with a slot and a pair of protruding portions extending toward each other from two opposite slot walls of the slot. Two opposite sides of the distal end of the torsion bar are provided with a pair of recessed portions. The distal end of the torsion bar can be inserted into the slot of the foot portion, and the pair of protruding portions of the slot can respectively engage with the pair of recessed portions.

According to the fastening strap clamp assembly mentioned above, the support portion comprises an accommodating cavity for accommodating the head portion and a flange for supporting the head portion, the flange protruding from an inner surface of the accommodating cavity and defining a passage for the fixing pin to pass therethrough.

According to the fastening strap clamp assembly, the head portion of the fixing pin comprises a blocking device that fits with the accommodating cavity to limit a torsion angle of the torsion bar.

According to the fastening strap clamp assembly mentioned above, the at least one cam surface extends gradually away from the extension axis in a direction toward the head portion. The at least one release surface is formed at the top of the actuator that is close to the head portion, and obliquely extends downward gradually away from the head portion in a direction toward the corresponding cam surface.

According to the fastening strap clamp assembly mentioned above, the actuator comprises a pair of actuating arms, and at least a part of the torsion bar is located between the pair of actuating arms. The at least one cam surface includes a pair of cam surfaces respectively formed on the pair of actuating arms, and at least one release surface includes a pair of release surfaces respectively connected to the pair of cam surfaces.

According to the fastening strap clamp assembly mentioned above, the support portion of the holder and the fixing seat can engage with each other in a hook fitting manner.

DETAILED DESCRIPTION OF EMBODIMENTS

Various specific embodiments of the present disclosure are described below with reference to the accompanying drawings which constitute part of this description. It is to be understood that although the terms indicating orientations, such as "front", "rear", "upper", "lower", "left", "right", "top" and "bottom", are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating directions are only illustrative and should not be considered as limitations.

An embodiment of the present disclosure provides a fastening strap clamp assembly, which can be used to connect a first component (e.g., an A-pillar trim panel of a vehicle) to a second component (e.g., a metal plate of the vehicle), so that before and during the deployment of a safety airbag covered by the A-pillar trim panel of the vehicle, the first component (e.g., the A-pillar trim panel of the vehicle) and the second component (e.g., the metal plate of the vehicle) of the vehicle can be securely fastened together to prevent the A-pillar trim panel from being separated from the metal plate of the vehicle.

Figure 1A:
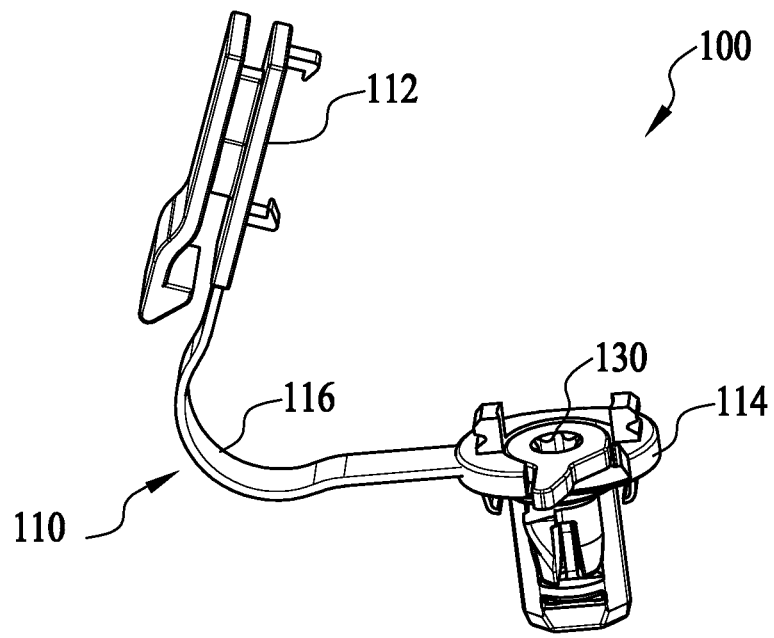
FIG. 1A is a perspective view of a fastening strap clamp assembly according to an embodiment of the present disclosure.
Figure 1B:
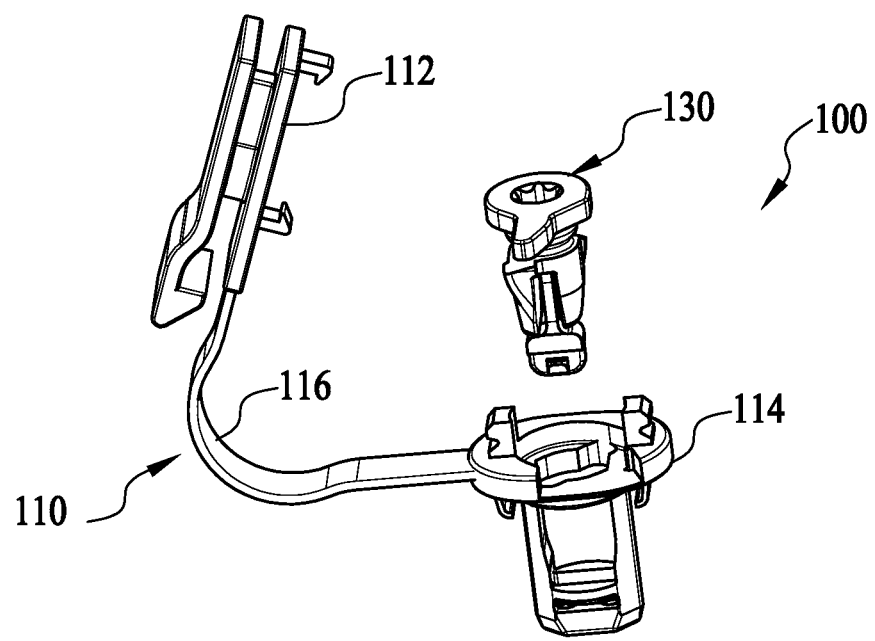
FIG. 1B is an exploded view of the fastening strap clamp assembly shown in FIG. 1A.

FIGS. 1A and 1B show a fastening strap clamp assembly 100 according to an embodiment of the present disclosure, FIG. 1A being a perspective view of the fastening strap clamp assembly 100, and FIG. 1B being an exploded view of the fastening strap clamp assembly 100 shown in FIG. 1A. As shown in FIGS. 1A and 1B, the fastening strap clamp assembly 100 comprises a fastening strap housing 110 and a fixing pin 130 which are assembled together to form the fastening strap clamp assembly 100.

The fastening strap housing 110 may be a plastic one-piece component formed by integral molding. The fastening strap housing 110 comprises a fixing seat 112, a holder 114, and a fastening strap 116 that connects the fixing seat 112 to the holder 114. The fixing seat 112 is configured to be fixed to the first component (e.g., a first component 510 shown in FIG. 5), and the holder 114 is configured to be fixed to the second component (e.g., a second component 520 shown in FIG. 5). For example, the fixing seat 112 is fixed to a corresponding mounting portion of the first component by means of a latch, a hook, etc. The holder 114 is at least partially inserted into a hole of the second component and is locked in the hole of the second component by means of the fixing pin 130. The fastening strap 116 is long strip-shaped, so that the fastening strap 116 can allow the fixing seat 112 and the holder 114 to be separated from each other by a distance while connecting the fixing seat 112 to the holder 114. The number of fastening strap 116 is not limited to one as shown in the figure, but a plurality of fastening straps may be provided.

Figure 2A:
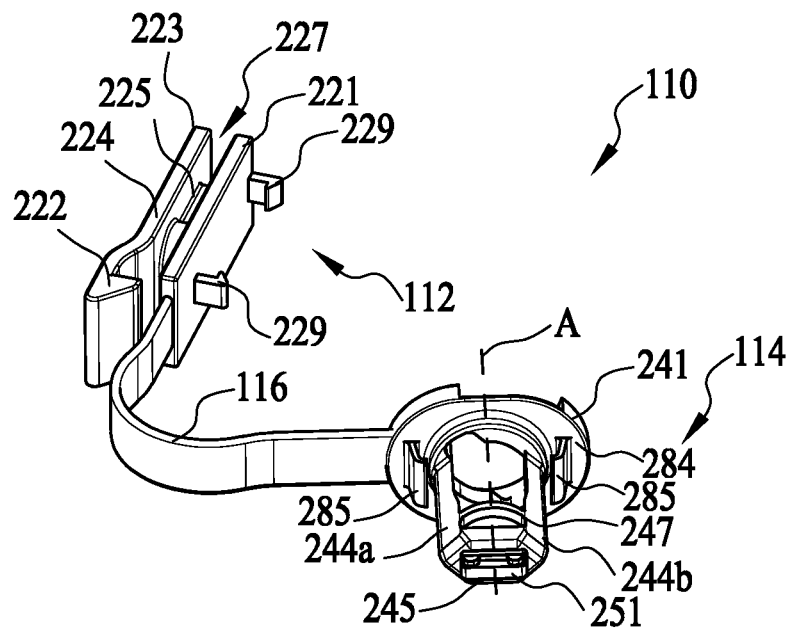
FIG. 2A is a perspective view of a case of the fastening strap clamp assembly shown in FIG. 1B.
Figure 2B:
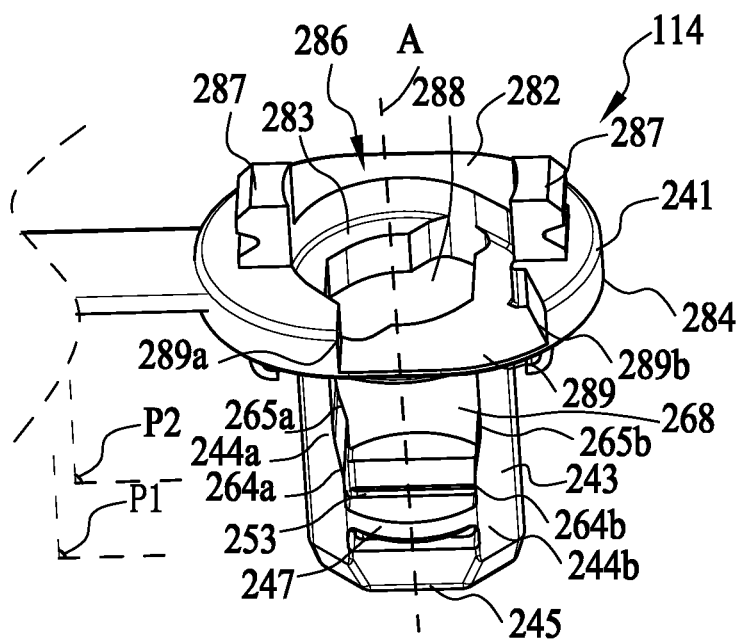
FIG. 2B is an enlarged perspective view of a holder of the fastening strap housing shown in FIG. 2A.

FIGS. 2A and 2B show the specific structures of the portions of the fastening strap housing 110, FIG. 2A being a perspective view of the fastening strap housing 110, and FIG. 2B being an enlarged perspective view of the holder 114 of the fastening strap housing 110. As shown in FIG. 2A, the fixing seat 112 comprises a first plate 221, a second plate 223, and a connecting beam 225 that connects the first plate 221 to the second plate 223. The connecting beam 225 may be of a plate-shaped structure extending perpendicular to the first plate 221 and the second plate 223. The connecting beam 225 is located between the first plate 221 and the second plate 223 and enables the two plates to be connected substantially parallel to each other. Optionally, the first plate 221 and the second plate 223 may also be connected in a manner of forming an angle relative to each other instead of being parallel to each other. Since the connecting beam 225 separates the first plate 221 and the second plate 223 from each other, there is a gap 227 between the first plate 221 and the second plate 223.

The first plate 221 is connected to the fastening strap 116 that is substantially flat strip-shaped. The second plate 223 comprises an extending portion 224 that is substantially flat strip-shaped and a hook portion 222 arranged at the end of the extending portion 224 that is close to the fastening strap 116. The extending portion 224 extends substantially parallel to the first plate 221. The hook portion 222 is formed of a bent structure that is bent toward the first plate 221. The hook portion 222 is configured to hook the first component fixed to the fixing seat 112 so as to improve the fixing effect of the fixing seat 112 on the first component. The side of the first plate 221 away from the second plate 223 is provided with a pair of engagement structures 229. The engagement structures 229, for example, in a hook shape shown in FIG. 2A, are used to engage with corresponding engagement structures on the holder 114.

As shown in FIGS. 2A and 2B, the holder 114 has a central axis A, and comprises a support portion 241 connected to the fastening strap 116 and a holding portion 243 extending from the support portion 241 in a direction along the central axis A. The holding portion 243 can be inserted into the hole of the second component.

The support portion 241 is substantially in the shape of a ring extending around the central axis A, and comprises a top surface 282 and a bottom surface 284 opposite to each other, and an accommodating cavity 286 extending from the top surface 282 to the bottom surface 284. The holding portion 243 extends from the bottom surface 284. The bottom surface 284 faces the second component to be mounted, and the bottom surface 284 is provided with a pair of fingers 285 for abutting against the second component. The fingers 285 are respectively located on two opposite sides of the accommodating cavity 286. The top surface 282 is provided with corresponding engagement structures 287 for engaging with the engagement structures 229 on the fixing seat 112, so that the support portion 241 and the fixing seat 112 can engage with each other in a hook fitting manner. The corresponding engagement structure 287 of the holder 114, for example, has a recess that can receive the hook portion.

The support portion 241 further comprises a flange 283 extending from an inner surface of the accommodating cavity 286. The flange 283 defines a passage 288. The shape of the cross section of the passage 288 in a direction perpendicular to the central axis A fits with the shape of the cross section of the fixing pin 130 having the maximum radial size, so that the fixing pin 130 can be inserted into the passage 288, and during the insertion process of the fixing pin 130, the passage 288 can function to guide the fixing pin 130.

The support portion 241 further comprises an opening 289 that opens into the accommodating cavity 286, and the opening 289 forms a notch on the support portion 241. The opening 289 does not penetrate the support portion 241 in the direction of the central axis A, and the flange 283 is still provided below the opening 289. The opening 289 has a pair of opposite side walls 289a, 289b for limiting rotation of the fixing pin 130.

The holding portion 243 of the holder 114 comprises a pair of legs 244a, 244b extending parallel to each other along the central axis A. The pair of legs 244a, 244b are located on the two opposite sides of the central axis A, and are thus separated from each other by a distance, so that an insertion portion of the fixing pin 130 is accommodated between the legs. The pair of legs 244a, 244b are connected to the support portion 241 at proximal ends of the legs. The holding portion 243 is connected to a foot portion 245 that is located between distal ends of the pair of legs 244a, 244b, and the foot portion 245 is provided with a slot 251 for fitting with the fixing pin 130. In addition, the holding portion 243 further comprises a position limiting structure 247. The position limiting structure 247 is arranged between the pair of legs 244a, 244b and located above the foot portion 245. A passage 253 is formed in the position limiting structure 247, and the passage 253 is aligned to the slot 251 in the foot portion 245 in the direction along the central axis A. The specific structures of the foot portion 245 and the position limiting structure 247 are shown more clearly in FIGS. 4C and 4D.

The pair of legs 244a, 244b each comprise a front side edge 264a, 264b extending in the direction along the central axis A and a rear side edge 265a, 265b extending in the direction along the central axis A. The two front side edges 264a, 264b are located on a plane P1, and the two rear side edges 265a, 265b are located on a plane P2. The two planes P1 and P2 are substantially parallel to each other and define an inter-leg space 268 therebetween.

Figure 3A:
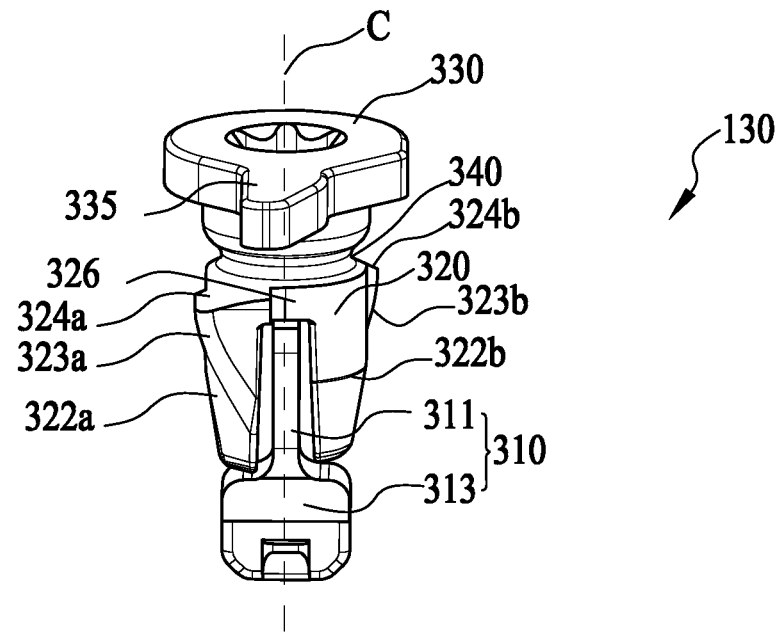
FIG. 3A is a perspective view, viewed from the top down, of a fixing pin of the fastening strap clamp assembly shown in FIG. 1B.
Figure 3B:
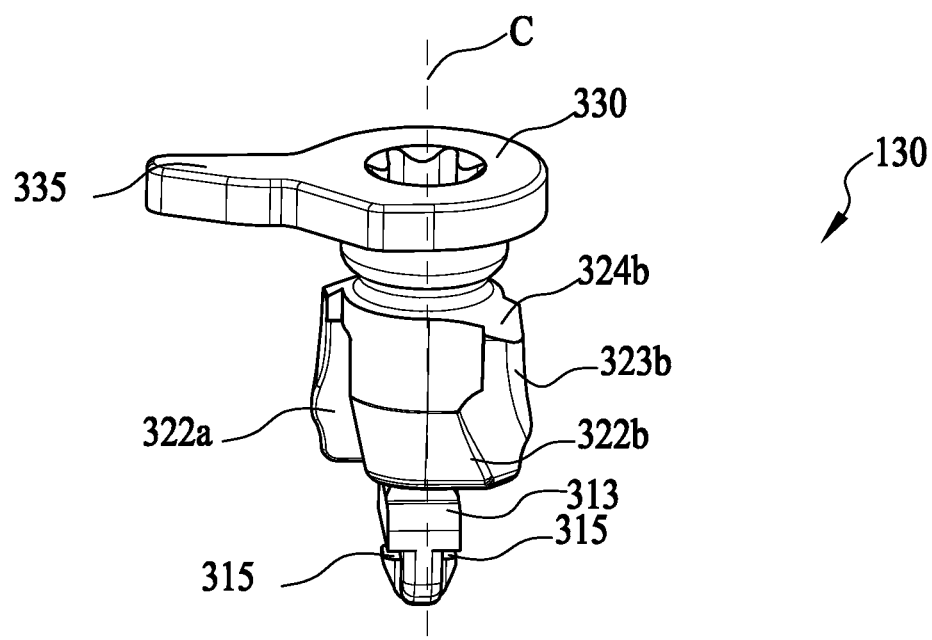
FIG. 3B is another perspective view, viewed from the top down, of the fixing pin of the fastening strap clamp assembly shown in FIG. 1B.

FIGS. 3A-3B show the specific structure of the fixing pin 130, FIG. 3A being a perspective view of the fixing pin 130 viewed from the top down, and FIG. 3B being another perspective view of the fixing pin 130 viewed from the top down. The fixing pin 130 shown in FIG. 3B is the fixing pin 130 shown in FIG. 3A rotating by an angle in the clockwise direction around an extension axis C of the fixing pin 130. The fixing pin 130 is configured to lock the holder 114 in a hole 525 of the second component 520.

As shown in FIGS. 3A and 3B, the fixing pin 130 comprises: a torsion bar 310 extending along the extension axis C, an actuator 320, a head portion 330, and a neck portion 340 that connects the actuator 320 and the torsion bar 310 to the head portion 330. The torsion bar 310 and the actuator 320 are connected to the head portion 330 from the same side. The actuator 320 has a substantially inverted "U"-shaped structure, and comprises a pair of actuating arms 322a, 322b and a connecting portion 326 that connects the pair of actuating arms 322a, 322b. The connecting portion 326 is connected to top ends of the pair of actuating arms 322a, 322b, and bottom ends of the pair of actuating arms 322a, 322b are free ends. The pair of actuating arms 322a, 322b connect to the head portion 330 via the connecting portion 326 and the neck portion 340. The pair of actuating arms 322a, 322b are symmetrically arranged with respect to the extension axis C.

The torsion bar 310 extends downward from a position of the connecting portion 326 of the actuator 320 between the pair of actuating arms 322a, 322b. The torsion bar 310 is substantially elongated and comprises a torsion portion 311 located between the pair of actuating arms 322a, 322b and an engagement portion 313 located below the pair of actuating arms 322a, 322b. One end of the torsion portion 311 is connected to the connecting portion 326 of the actuator 320, and the other end thereof is connected to the engagement portion 313. The engagement portion 313 is located at a distal end of the torsion bar 310. The torsion portion 311 of the torsion bar 310 is an elongated rod with uniform width and thickness, and the width of the engagement portion 313 of the torsion bar 310 is much greater than the width of the torsion portion 311, so that the engagement portion 313 extends in a width direction to a position directly below the pair of actuating arms 322a, 322b. In a thickness direction of the engagement portion 313, two opposite sides of the engagement portion 313 are provided with a pair of recessed portions 315 for engaging with the foot portion 245 of the holder 114, which will be described in detail in conjunction with FIGS. 4A-4D.

Still referring to FIGS. 3A and 3B, the actuator 320 further comprises a pair of cam surfaces 323a, 323b provided on the pair of actuating arms 322a, 322b and a pair of release surfaces 324a, 324b provided on the top of the actuator 320, the pair of release surfaces 324a, 324b being respectively connected to the pair of cam surfaces 323a, 323b. The pair of cam surfaces 323a, 323b spirally extend around the extension axis C and gradually away from the extension axis C in a direction toward the head portion 330. That is, as the pair of cam surfaces 323a, 323b extends toward the head portion 330, the pair of cam surfaces 323a, 323b extend gradually away from each other, and the distance between the pair of cam surfaces 323a, 323b reaches the maximum at top ends thereof connected to the release surfaces 324a, 324b. The pair of release surfaces 324a, 324b obliquely extend downward gradually away from the head portion 330 in a direction toward the corresponding cam surfaces 323a, 323b. That is, instead of extending in a direction not perpendicular to the extension axis C, the release surfaces 324a, 324b extend to form an included angle with this direction. The cam surfaces 323a, 323b and the release surfaces 324a, 324b are provided to allow the fastening strap clamp assembly 100 to be secured in the hole of the second component and removed from the second component, which will be described in detail below.

The top of the head portion 330 is provided with an operating cavity 332, and the operating cavity 332 is configured to be engageable with an operating tool, so that an operator can use the operating tool to drive the head portion to rotate, so that the actuator 320 and the torsion bar 310 are driven to rotate so as to release the fastening strap clamp assembly 100 from the second component. The head portion 330 is further provided with a blocking device 335, and the blocking device 335 cooperates with the accommodating cavity 286 in the support portion 241 of the holder 114 to limit a torsion angle of the torsion bar 310. In an embodiment shown in FIGS. 3A and 3B, the blocking device 335 is a tab extending from the head portion 330, and moves in the opening 289 in the support portion 241 of the holder 114 and contacts with the side walls 289a, 289b of the opening 289. In addition, the blocking device 335 is sized such that, when the fixing pin 130 is mounted in the holder 114 in place, the blocking device 335 extends to the outside of the accommodating cavity 286 of the support portion 241 from the opening 289 of the support portion 241. Therefore, the operator can also operate the blocking device 335 by hand (without using a tool) to drive the head portion 330 to rotate.

Figure 4A:
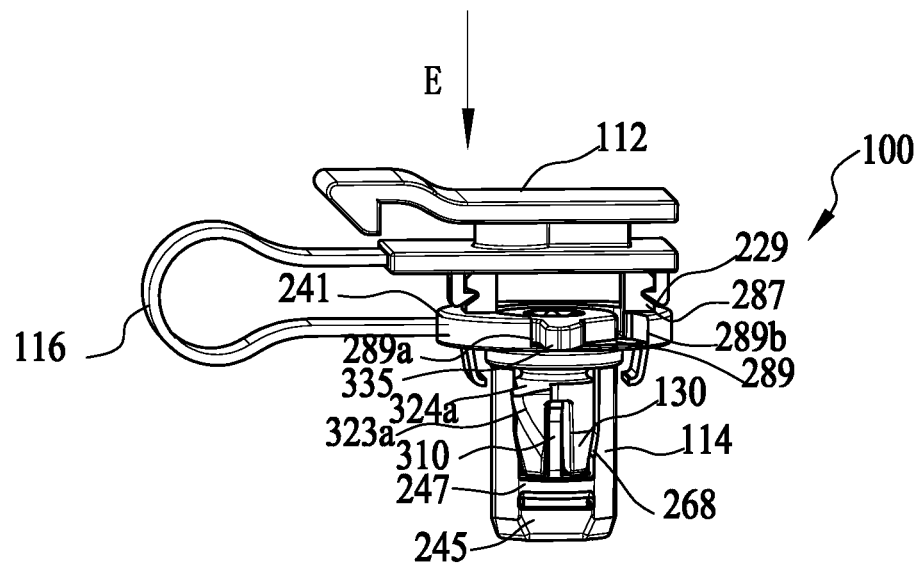
FIG. 4A is a perspective view of the fastening strap clamp assembly shown in FIG. 1A in a pre-assembled state.
Figure 4B:
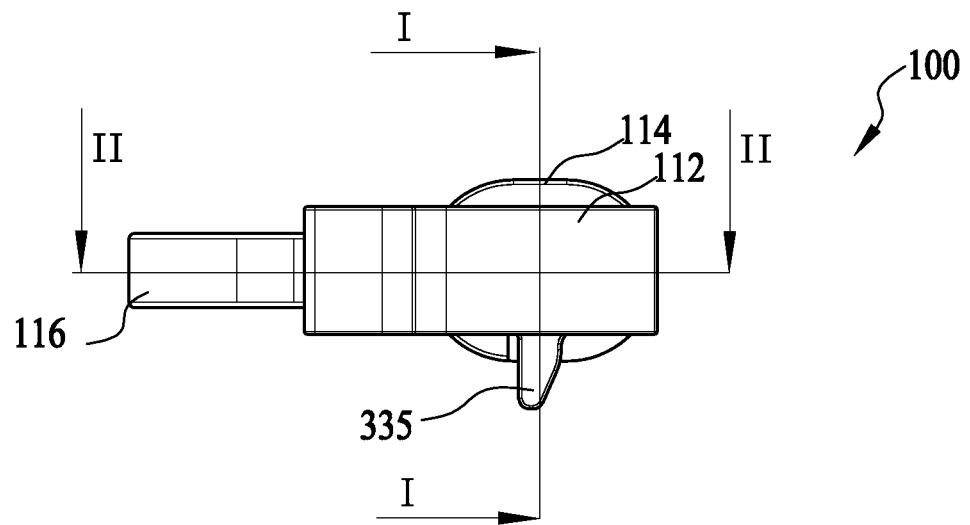
FIG. 4B is a top view of the fastening strap clamp assembly shown in FIG. 4A along arrow E.
Figure 4C:
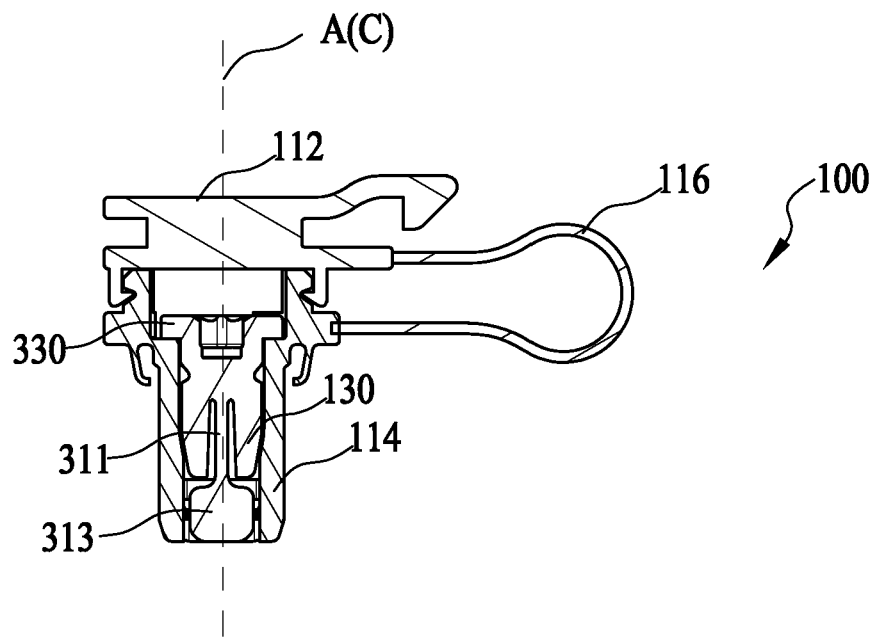
FIG. 4C is a sectional view of the fastening strap clamp assembly shown in FIG. 4B along line I-I.
Figure 4D:
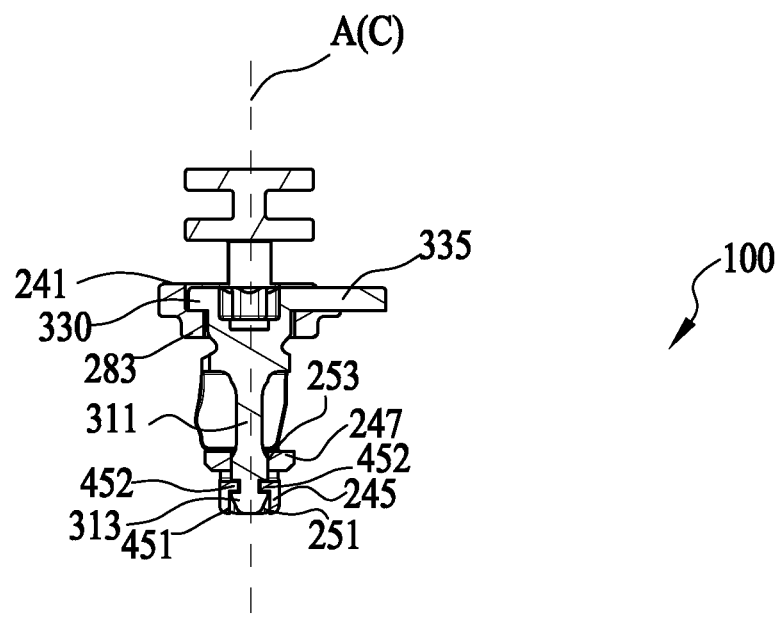
FIG. 4D is a sectional view of the fastening strap clamp assembly shown in FIG. 4B along line II-II.

FIGS. 4A-4D show a fastening strap clamp assembly 100 in a pre-assembled state, and shows the cooperating relationship among the components of the fastening strap clamp assembly 100, FIG. 4A being a perspective view of the fastening strap clamp assembly 100 in the pre-assembled state, FIG. 4B being a top view of the fastening strap clamp assembly 100 shown in FIG. 4A along arrow E, FIG. 4C being a sectional view of the fastening strap clamp assembly shown in FIG. 4B along line I-I, and FIG. 4D being a sectional view of the fastening strap clamp assembly shown in FIG. 4B along line II-II. As shown in FIGS. 4A-4D, when the fastening strap clamp assembly 100 is in the pre-assembled state, the fixing pin 130 is inserted into the holder 114 in place, and the pair of engagement structures 229 on the fixing seat 112 engage with the corresponding engagement structures 287 on the holder 114, so that the fastening strap 116 is in a bent state, the fixing seat 112 is disposed next to the holder 114, and thus the entire fastening strap clamp assembly 100 is in a collapsed state. The fastening strap clamp assembly 100 in the pre-assembled state can be conveniently transported and stored.

As shown in FIGS. 4A-4D, when the fixing pin 130 is inserted into the holder 114 in place, the extension axis C of the fixing pin 130 coincides with the central axis A of the holder 114. The head portion 330 of the fixing pin 130 is supported by the flange 283 on a support portion 241 of the holder 114. The blocking device 335 on the head portion 330 is located in the opening 289 of the support portion 241, and the distance between the two side walls 289a, 289b of the opening 289 is greater than the size of the blocking device 335, so that the blocking device 335 can rotate around the extension axis C in the opening 289. The engagement portion 313 of the torsion bar 310 of the fixing pin 130 is inserted into the slot 251 in the foot portion 245 of the holder 114 and the passage 253 in the position limiting structure 247. The pair of cam surfaces 323a, 323b of the fixing pin 130 respectively extend through the plane P1 where the front side edges 264a, 264b of the pair of legs 244a, 244b are located and the plane P2 where the rear side edges 265a, 265b are located and extend out of the inter-leg space 268, and the pair of release surfaces 324a, 324b are located outside the inter-leg space 268.

As shown in FIG. 4D, the slot 251 in the foot portion 245 of the holder 114 is internally provided with a pair of protruding portions 452 extending toward each other from the two opposite slot walls 451 of the slot 251, the protruding portions 452 respectively extending into the recessed portions 315 in the engagement portion 313 of the torsion bar 310. In this way, the engagement portion 313 of the torsion bar 310 is fixed in the foot portion 245 of the holder 114 in a shape fitting manner. The shape and size of the passage 253 in the position limiting structure 247 of the holder 114 are designed to match with the shape and size of an upper portion of the engagement portion 313 of the torsion bar 310, so that the position limiting structure 247 can further prevent the engagement portion 313 of the torsion bar 310 from moving relative to the holder 114.

Since the fastening strap housing 110 is a plastic part, the slot 251 in the foot portion 245 of the holder 114 and the passage 253 in the position limiting structure 247 are provided such that the foot portion 245 and the position limiting structure 247 have certain elasticity and can generate certain elastic deformation when applying a force thereon. Therefore, although the thickness of a bottom end of the engagement portion 313 of the torsion bar 310 is greater than the distance between the pair of protruding portions 452 in the foot portion 245 of the holder 114, the engagement portion 313 of the torsion bar 310 can still pass between the pair of protruding portions 452 in the foot portion 245. In the process of inserting the fixing pin 130 into the holder 114, the bottom end of the engagement portion 313 of the torsion bar 310 will enlarge the distance between the pair of protruding portions 452, so that the bottom end of the engagement portion 313 can pass between the pair of protruding portions 452 in the foot portion 245, until the pair of protruding portions 452 on the engagement portion 313 respectively extend into the recessed portions 315 on the engagement portion 313 of the torsion bar 310, and the distance between the pair of protruding portions 452 will restore to the state that the foot portion 245 has not been stressed. By means of the cooperation between the protruding portions 452 and the recessed portions 315, the engagement portion 313 of the torsion bar 310 is fixed in the foot portion 245 of the holder 114 and cannot be twisted along with the torsion portion 311 of the torsion bar 310.

At a pre-assembled position shown in FIGS. 4A-4D, the torsion portion 311 of the torsion bar 310 is not twisted and is in an unstressed state.

Figure 5A:
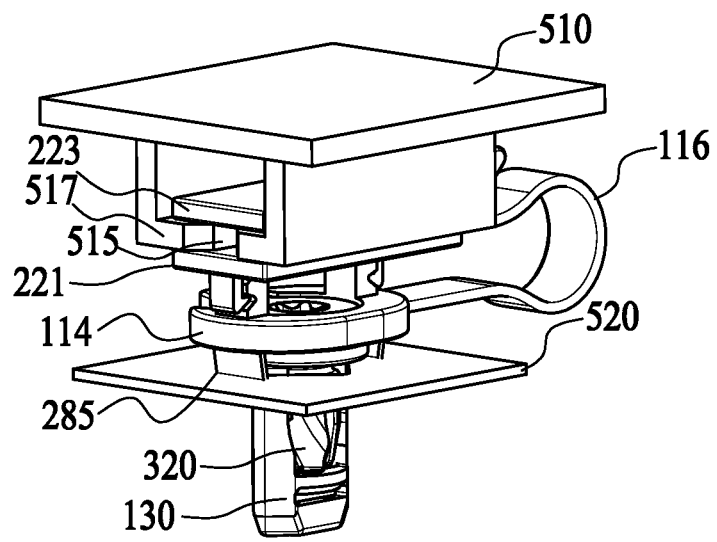
FIG. 5A is a perspective view from a first perspective of the fastening strap clamp assembly shown in FIG. 1A when fixed to a first component and a second component.
Figure 5B:
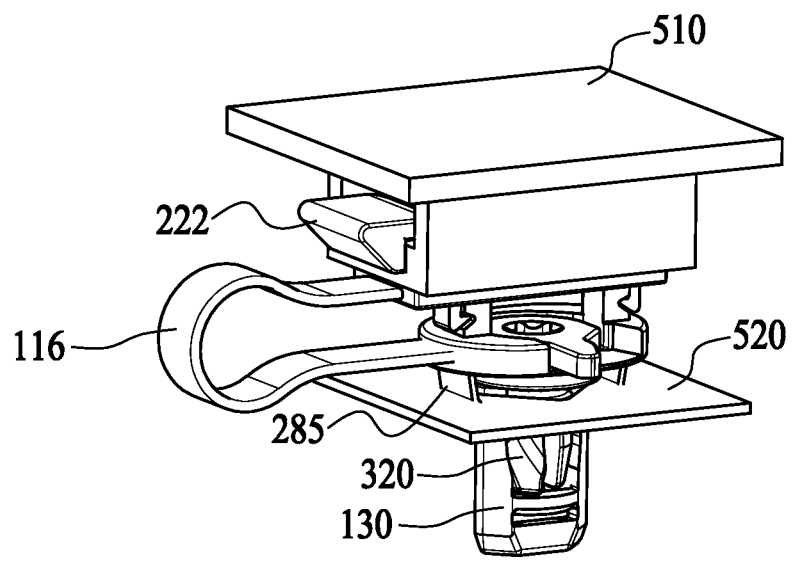
FIG. 5B is a perspective view from a second perspective of the fastening strap clamp assembly shown in FIG. 1A when fixed to the first component and the second component.
Figure 5C:
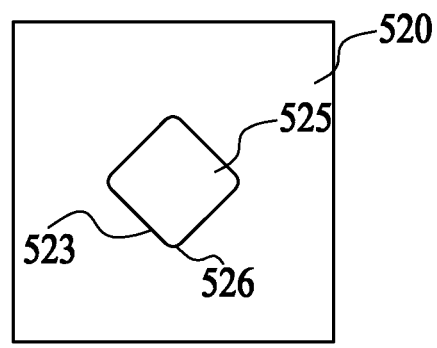
FIG. 5C is a top view of the second component in FIG. 5A.

FIGS. 5A-5C show the cooperating relationship between the fastening strap clamp assembly 100 in a use state and the components fixed to the fastening strap clamp assembly, FIG. 5A being a perspective view from a first perspective of the fastening strap clamp assembly 100 when fixed to the first component and the second component, FIG. 5B being a perspective view from a second perspective of the fastening strap clamp assembly 100 when fixed to the first component and the second component, and FIG. 5C being a top view of the second component shown in FIG. 5A. As shown in FIGS. 5A and 5B, the fastening strap clamp assembly 100 is used to fix the first component 510 to the second component 520, with the fixing seat 112 of the fastening strap clamp assembly 100 being fixed to the first component 510, and the holder 114 being fixed to the second component 520. The first component 510 comprises a connecting plate 517 in which an insertion slot 515 is formed. The insertion slot 515 extends in a length direction of the connecting plate 517, but does not penetrate the connecting plate 517 in the length direction, and thus the insertion slot 515 has an open end 512 and a closed end (not shown in the figure) opposite to each other. The connecting beam 225 of the fixing seat 112 (covered from view in FIGS. 5A-5C) is inserted into the insertion slot 515 from the open end 512, and the connecting plate 517 is clamped in the gap 227 between the first plate 221 and the second plate 223 of the fixing seat 112. The hook portion 222 of the fixing seat 112 hooks the end of the connecting plate 517 that is close to the closed end of the insertion slot 515. The second component 520 is provided with a through hole 525 (as shown in FIG. 5C), and the holder 114 is fixed in the hole of the second component 520 by means of the fixing pin 130. More specifically, the second component 520 is clamped between the fingers 285 on the bottom face 284 of the support portion 241 and the actuating portion 320 of the fixing pin 130 and is thus locked in place.

As shown in FIG. 5C, the through hole 525 in the second component 520 is a substantially square hole comprising four edges 523 and corners 526 formed by the adjacent edges 523. The hole 525 is sized such that the distance D1 between the two opposite corners 526 is greater than the distance between vertices of the pair of cam surfaces 323a, 323b, so that the actuating portion 320 of the fixing pin 130 can pass through the hole 525 when the pair of cam surfaces 323a, 323 are respectively aligned with a pair of corners 526. Also, the size of the hole 525 is also related to the pair of legs 224a, 224b of the holder 114. Specifically, the distance D1 between the two opposite corners 526 is slightly greater than the maximum distance dl between outer contours of the pair of legs 224a, 224b of the holder 114, so that the holder 114 can be inserted into the hole 525 only when the pair of legs 224a, 224b are respectively aligned with the two opposite corners 526. This configuration, on the one hand, facilitates the positioning of the holder 114 relative to the second component 520 when mounted in the hole 525, and, on the other hand, can prevent the holder 114 from rotating relative to the second component 520 by the interaction between the pair of legs 224a, 224b of the holder 114 and the hole 525 after the holder 114 is mounted in the hole 525 in place.

Figure 6A:
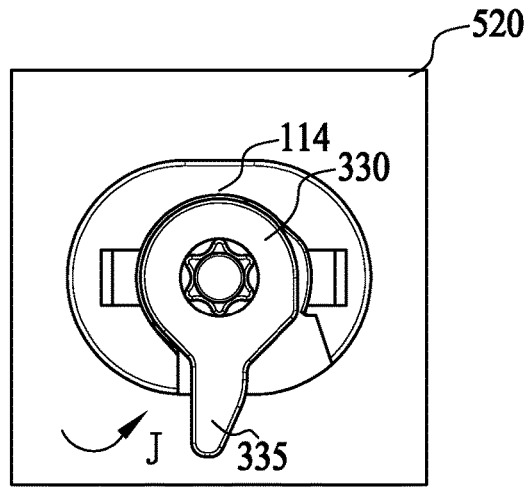
FIG. 6A is a partial top view of the fastening strap clamp assembly shown in FIG. 5A when a fixing pin is in a locked position.
Figure 6B:
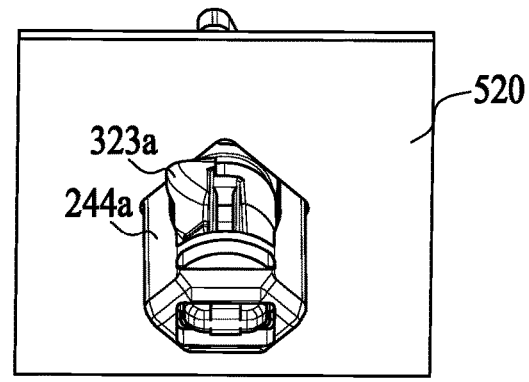
FIG. 6B is partial perspective view, viewed from the bottom up, of the fastening strap clamp assembly shown in FIG. 5A when the fixing pin is in the locked position.

FIGS. 6A and 6B show the positional relationship of the fixing pin 130 and the holder 114 with the hole 525 of the second component 520 in the fastening strap clamp assembly 100 when the fixing pin 130 is in a locked position, FIG. 6A being a partial top view of the fastening strap clamp assembly 100 when the fixing pin 130 is in the locked position, and FIG. 6B being a partial perspective view, viewed from the bottom up, of the fastening strap clamp assembly 100 when the fixing pin 130 is in the locked position. For the convenience of illustration, the first component 510 and the fixing seat 112 are removed in FIGS. 6A and 6B. As shown in FIGS. 6A and 6B, when the fixing pin 130 is in the locked position, the blocking device 335 of the head portion 330 of the fixing pin 130 is disposed close to the side wall 289a of the opening of the holder 140, and the cam surfaces 323a, 323b are located directly below the edges 523 of the second component 520 and thus shielded by the second component 520.

Figure 7A:
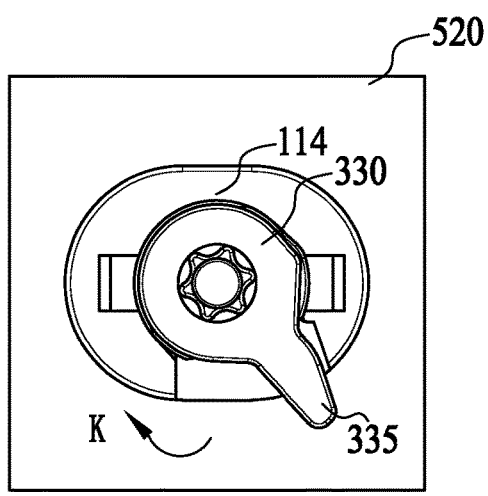
FIG. 7A is a partial top view of the fastening strap clamp assembly shown in FIG. 5A when the fixing pin is in a released state.
Figure 7B:
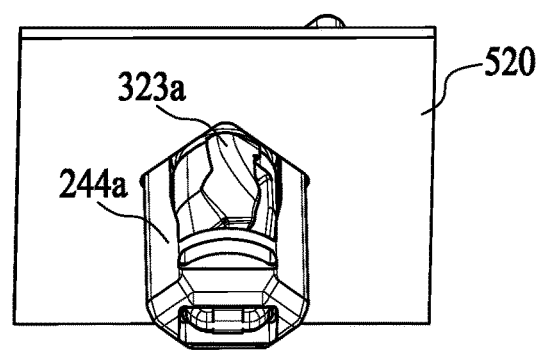
FIG. 7B is a partial perspective view, viewed from the bottom up, of the fastening strap clamp assembly shown in FIG. 5A when the fixing pin is in the released state.

FIGS. 7A and 7B show the positional relationship of the fixing pin 130 and the holder 114 with the hole 525 of the second component 520 in the fastening strap clamp assembly 100 when the fixing pin 130 is in a released position, FIG. 7A being a partial top view of the fastening strap clamp assembly 100 when the fixing pin 130 is in the released position, and FIG. 7B being a partial perspective view, viewed from the bottom up, of the fastening strap clamp assembly 100 when the fixing pin 130 is in the released position. For the convenience of illustration, the first component 510 and the fixing seat 112 are removed in FIGS. 7A and 7B. As shown in FIGS. 7A and 7B, when the fixing pin 130 is in the released position, the blocking device 335 of the head portion 330 of the fixing pin 130 is disposed close to the side wall 289b of the opening of the holder 140. Although the cam surfaces 323a, 323b are located below the second component 520, they are located at the corners 526 of the hole 525 and thus not shielded by the second component 520. The head portion 330 of the fixing pin 130 in FIGS. 7A and 7B is the head portion 330 of the fixing pin 130 in FIGS. 6A and 6B rotated by an angle in an anticlockwise direction.

An exemplary way of a process of connecting the fastening strap clamp assembly 100 to the first component 510 and the second component 520 and then reaching the use state shown in FIGS. 5A and 5B will be described below.

When the fastening strap clamp assembly 100 is connected to the first component 510 and the second component 520, firstly, the fixing seat 112 of the fastening strap clamp assembly 100 in the pre-assembled state (as shown in FIG. 4A) is fixedly connected to the first component 510, so that the fastening strap clamp assembly 100 is pre-mounted on the first component 510. Then, the holder 114 of the fastening strap clamp assembly 100 is locked in the second component 520 by means of the fixing pin 130.

The fixing seat 112 can be easily fixedly connected to the first component 510. It is only necessary to align the connecting plate 517 of the first component 510 with the gap 227 between the first plate 221 and the second plate 223 of the fixing seat 112, and insert the connecting beam 225 of the fixing seat 112 into the insertion slot 515 from the open end 512 of the insertion slot 515 in the connecting plate 517 of the first component 510 until the hook portion 222 of the fixing seat 112 hooks the end of the connecting plate 517 that is close to the closed end of the insertion slot 515.

The process of locking the holder 114 into the second component 520 by means of the fixing pin 130 will be described below in conjunction with FIGS. 4A, 5A-5C, 6A, 6B, 7A and 7B.

When the fastening strap clamp assembly 100 is in the pre-assembled state shown in FIG. 4A, the position of the fixing pin 130 in the holder 114 is the same as the locked position shown in FIGS. 6A and 6B. In this position state, the holder 114, together with the fixing pin 130 therein, is inserted into the hole 525 of the second component 520. Since the fastening strap clamp assembly is now fixed with the first component 510, the operator firstly places the pair of legs 224a, 224b of the holder 114 against the pair of corners 526 of the hole 525, respectively, and then applies a downward insertion force to the top of the first component 510 (the insertion force is then applied to the fastening strap clamp assembly 100), so that the ends of the pair of legs 224a, 224b of the holder 114 are inserted into the hole 525. As the holder 114 and the fixing pin 130 are gradually inserted downward, the pair of cam surfaces 323a, 323b of the fixing pin 130 abut against the pair of edges 523 of the hole 525. Since the cam surfaces 323a, 323b extend gradually away from the extension axis C from bottom to top, under the insertion force applied to the fastening strap clamp assembly 100, the cam surfaces 323a, 323b of the fixing pin 130 slide at the edges 523 of the hole 525, so that the actuating portion 320 of the fixing pin 130 rotates around the central axis A. Since the engagement portion 313 of the torsion bar 310 is fixed by the foot portion 245 of the holder 114, under the rotation of the actuating portion 320 around the central axis A, the torsion portion 311 of the torsion bar 310 is driven to twist around the central axis A in a direction indicated by arrow J in FIG. 6A until the pair of cam surfaces 323a, 323b slide to the top end of the torsion bar relative to the edges 523 of the hole (i.e., the insertion process ends). Since the top ends of the cam surfaces 323a, 323b are connected to the release surfaces 324a, 324b, by means of the release surfaces 324a, 324b and the edges 523 of the hole 525, the actuating portion 320 can pass through the hole 525 and reach a position below the second component 520, and the torsion bar 310 is twisted back in a direction indicated by arrow K in FIG. 7A to restore to an initial state in which the torsion bar is substantially not stressed (undeformed), that is, reaching the state shown in FIG. 6A. In this way, the second component 520 is clamped between the actuating portion 320 of the fixing pin 130 and the support portion 241 of the holder 114, so that the holder 114 is locked in the second component 520.

Thus, the fastening strap clamp assembly 100 reaches the use state shown in FIGS. 5A and 5B, and the first component 510 is fixed in place relative to the second component 520.

When the holder 114 needs to be removed from the second component 520, a tool can be used to cooperate with the operating cavity 332 in the head portion 330 of the fixing pin 130 (or the blocking device 335 of the head portion 330 is directly manipulated by hand), so that the head portion 330 of the fixing pin 130 is twisted in the direction indicated by arrow J in FIG. 6A until the fixing pin 130 reaches a released position shown in FIG. 7B, so that the fixing pin 130 and the holder 114 can be removed from the second component 520.

Figure 8:
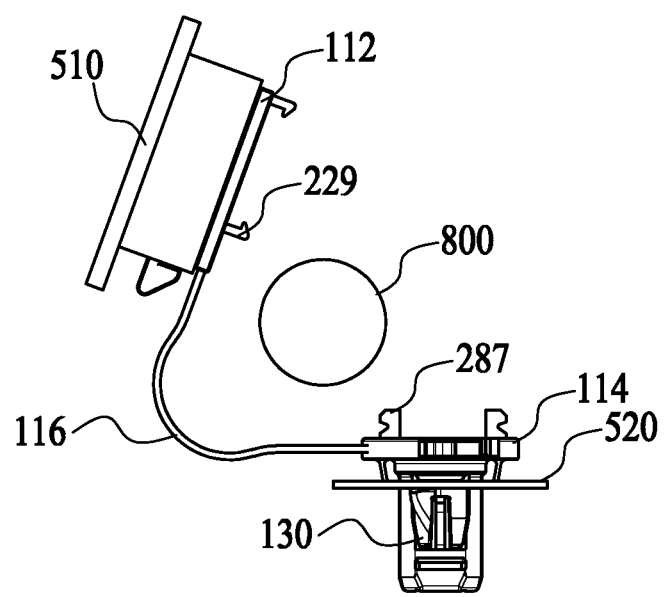
FIG. 8 is a side view of the fastening strap clamp assembly shown in FIG. 5A when an airbag is deployed.

FIG. 8 is a side view of the fastening strap clamp assembly shown in FIG. 5A when an airbag is deployed. In a use environment in which the first component 510 is a pillar trim panel of a vehicle and the second component 520 is a metal plate of the vehicle, a safety airbag that is not deployed is arranged between the first component 510 and the second component 520 in the state shown in FIGS. 5A and 5B. When the safety airbag 800 is deployed instantaneously, the safety airbag 800 applies a force to the first component 510 to enable the engagement structure 229 of the fixing seat 112 to be separated from the corresponding engagement structure 287 on the holder 114, so that the first component 510 is ejected away from the second component 520. In such a use environment, it is particularly convenient and reliable by using the fastening strap clamp assembly 100 of the present disclosure. This is because the fixing pin 130 of the fastening strap clamp assembly 100 of the present disclosure actuates the torsion bar to twist by the actuating force generated by the sliding engagement of the cam surface with the edge of the hole, so that the automatic secure connection between the holder 114 of the fastening strap clamp assembly 100 and the second component 520 can be achieved simply by applying a downward insertion force to the fastening strap clamp assembly 100 without the use of a tool, which is especially adapted to the streamlined installation process during the mass production process of vehicles and enables workers to ensure to install it in place without the need to learn special installation skills. Also, the above structure also enables the fixing pin 130 to securely lock the holder 114 in the second component 520; so that the holder 114 will not be pulled away from the second component 520 by the first component 510 due to the large ejection force when the airbag is deployed instantaneously. That is, when the airbag is deployed instantaneously, the second component 520 will restrict the first component 510 by means of the fastening strap 116, which prevents the first component 510 from being ejected to the passenger space in the vehicle. In addition, according to the fastening strap clamp assembly 100 of the present disclosure, the fixing pin 130 can be moved from the locked position to the released position by means of a simple tool (or a simple operation directly by hand), so as to remove the holder 114 from the second component 520, which can facilitate replacement or reinstallation of the safety airbag. In addition, according to the fastening strap clamp assembly 100 of the present disclosure, the torsion bar 310 of the fixing pin 130 is fixed to the holder 114 in an assembled manner, and the fixing pin 130 and the holder 114 are separately manufactured, so that the requirement on a mold is not high.

The fastening strap clamp assembly according to the present disclosure is not limited to the embodiments described above, and other embodiments may be possible. For example, the torsion bar can engage with the holder at the distal end of the torsion bar in other ways instead of the shape fitting manner. The number of the cam surfaces may be one instead of two. The number of the release surfaces may also be one instead of two, and so on.

Although the present disclosure is described in conjunction with the examples of embodiments outlined above, various alternatives, modifications, variations, improvements, and/or substantial equivalents that are known or current or to be anticipated before long may be obvious to those of at least ordinary skill in the art. Accordingly, the examples of the embodiments of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements, and/or substantial equivalents. The technical effects and technical problems in this specification are exemplary rather than limiting. It should be noted that the embodiments described in this specification may have other technical effects and can solve other technical problems.

What is claimed is:

1. A fastening strap clamp assembly configured to fasten a first component and a second component of a vehicle together before and during deployment of a safety airbag of the vehicle, the fastening strap clamp assembly comprising:
 a fastening strap housing comprising a fixing seat, a holder, and a fastening strap that connects the fixing seat to the holder, wherein the fixing seat is configured to be fixed to the first component, and the holder is configured to be at least partially inserted into a hole of the second component; and
 a fixing pin, the fixing pin having a locked position, the fixing pin being configured to lock the holder in the hole of the second component at the locked position, and the fixing pin comprising:
  a torsion bar extending along an extension axis, the torsion bar being elastically deformable by twisting around the extension axis, and the torsion bar engaging with the holder at a distal end of the torsion bar; and
  an actuator, the actuator being connected to a proximal end of the torsion bar, the actuator comprising at least one cam surface and at least one release surface connected to the at least one cam surface, wherein the at least one cam surface spirally extends around the extension axis and is configured to fit with an edge of the hole of the second component to drive the torsion bar to twist to enable the fixing pin to be inserted into the hole of the second component; wherein the at least one release surface is configured to fit with the edge of the hole of the second component, so that at the end of the process of inserting the fixing pin into the hole of the second component, the torsion bar restores to a substantially undeformed state to lock the holder in the hole of the second component; and wherein the fixing pin is configured to be capable of being released from the locked position by torsion of the torsion bar to enable the holder to be removed from the second component.

2. The fastening strap clamp assembly according to claim 1, wherein the fixing pin further comprises a head portion, the torsion bar and the actuator are connected to the head portion from the same side, and the head portion is configured to enable the fixing pin to be released from the locked position by means of manipulating the head portion.

3. The fastening strap clamp assembly according to claim 2, wherein the holder comprises a support portion and a holding portion, the support portion being connected to the fastening strap, and the holding portion extending around at least a part of the fixing pin and being capable of being inserted into the hole of the second component, wherein the holding portion is connected to the support portion at a proximal end of the holding portion, and the holding portion engages with the distal end of the torsion bar at a distal end of the holding portion and holds the distal end of the torsion bar, so as to enable the proximal end of the torsion bar to be twisted relative to the distal end of the torsion bar.

4. The fastening strap clamp assembly according to claim 3, wherein the holding portion comprises a pair of legs extending parallel to each other and a foot portion connected between distal ends of the pair of legs, the torsion bar and the actuator of the fixing pin are located between the pair of legs, and the distal end of the torsion bar engages with the foot portion in a shape fitting manner.

5. The fastening strap clamp assembly according to claim 4, wherein the foot portion is provided with a slot and a pair of protruding portions extending toward each other from two opposite slot walls of the slot; and two opposite sides of the distal end of the torsion bar are provided with a pair of recessed portions, wherein the distal end of the torsion bar is capable of being inserted into the slot of the foot portion, and the pair of protruding portions of the slot are respectively engageable with the pair of recessed portions.

6. The fastening strap clamp assembly according to claim 3, wherein the support portion comprises an accommodating cavity for accommodating the head portion and a flange for supporting the head portion, the flange protruding from an inner surface of the accommodating cavity and defining a passage for the fixing pin to pass therethrough.

7. The fastening strap clamp assembly according to claim 6, wherein the head portion of the fixing pin comprises a blocking device, wherein the blocking device cooperates with the accommodating cavity to limit a torsion angle of the torsion bar.

8. The fastening strap clamp assembly according to claim 2, wherein the at least one cam surface extends gradually away from the extension axis in a direction toward the head portion; and the at least one release surface is formed at the top of the actuator that is close to the head portion, and obliquely extends downward gradually away from the head portion in a direction toward the corresponding cam surface.

9. The fastening strap clamp assembly according to claim 2, wherein the actuator comprises a pair of actuating arms, and at least a part of the torsion bar is located between the pair of actuating arms; and the at least one cam surface includes a pair of cam surfaces, the pair of cam surfaces being respectively formed on the pair of actuating arms, and the at least one release surface includes a pair of release surfaces, the pair of release surfaces being respectively connected to the pair of cam surfaces.

10. The fastening strap clamp assembly according to claim 1, wherein the support portion of the holder and the fixing seat are engageable with each other in a hook fitting manner.

* * * * *